W. C. GROEHN.
FENDER CLIP.
APPLICATION FILED NOV. 25, 1907.
900,163.
Patented Oct. 6, 1908.
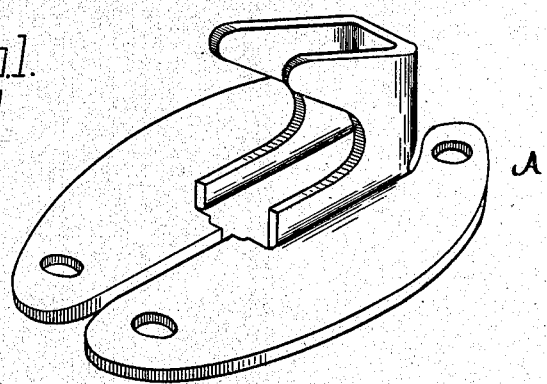
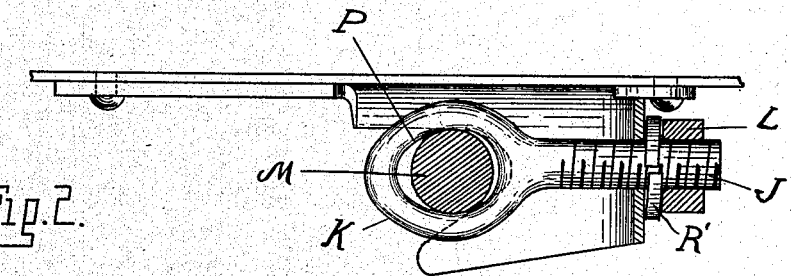
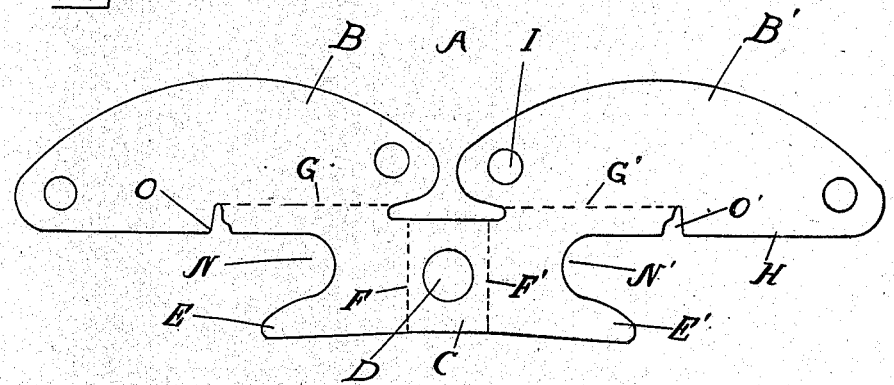
Witnesses
Inventor
William C. Groehn.
By Whittemore Hulbert & Whittemore
Attys

UNITED STATES PATENT OFFICE.

WILLIAM C. GROEHN, OF DETROIT, MICHIGAN, ASSIGNOR TO BRISCOE MANUFACTURING COMPANY, OF DETROIT, MICHIGAN, A CORPORATION OF MICHIGAN.

FENDER-CLIP.

No. 900,163.      Specification of Letters Patent.      Patented Oct. 6, 1908.

Application filed November 25, 1907. Serial No. 403,690.

*To all whom it may concern:*

Be it known that I, WILLIAM C. GROEHN, a citizen of the United States of America, residing at Detroit, in the county of Wayne and State of Michigan, have invented certain new and useful Improvements in Fender-Clips, of which the following is a specification, reference being had therein to the accompanying drawings.

The invention relates to clips for detachably securing an article such for instance as the wheel fender or mud guard of a vehicle to the supporting shank therefor.

It is the object of the invention to obtain a simple and inexpensive construction, and one which can be very quickly and easily attached or detached.

To the end the invention consists in the construction as hereinafter set forth.

In the drawings—Figure 1 is a perspective view of one member of the clip; Fig. 2 is a longitudinal section through the clip as secured to the shank; and Fig. 3 is a plan view of the blank from which the member illustrated in Fig. 1 is formed.

My construction comprises essentially a member adapted to be secured to the fender or other article, a bifurcated open bearing for engagement with the shank, and a clamping nut, such as an eye bolt arranged between the furcations of the first mentioned member. This eye bolt is provided with a threaded shank, which passes through an apertured bearing in the first mentioned member and engages a clamping nut by means of which it may be drawn up upon the shank. Inasmuch as the bifurcated bearing is open at one side, the shank may be laterally engaged therewith, and it is only necessary to thread the shank through the eye of the eye bolt member, which may be done either before or after its engagement with the clamping nut. Thus the device may be very quickly operated.

In detail, the fender engaging member is preferably formed of sheet metal and of a blank so fashioned that it may be struck up into the desired form. This blank A comprises two portions B and B' upon opposite sides of its longitudinal center and partly severed from each other. The connecting portion C has an aperture D formed therein and upon opposite sides the projecting prongs E E'. Thus, when the blank is bent upon the dotted lines F F', it will assume a U-shaped form, and by bending upon the dotted lines G G' the portions B B' are arranged in the same plane, and with their edges H adjacent to each other. The portions B B' form the securing flanges for attaching the clip to the fender or other article, and to this end are preferably provided with apertures I for bolts or rivets. When thus secured, the side flanges of the U shaped portion of the clip will be rigidly attached to the fender, while the connecting portion C of the U will brace these flanges from lateral deflection. Furthermore, this portion C forms the apertured bearing through which the threaded shank J of the eye bolt K passes, and against which the clamping nut L bears. M is a shank to which the clip is secured, which may be of any suitable section, but, as shown, is a round rod. This shank engages the open recesses N N' in the sides of the U formed between the prongs E E' thereof and the portions O O', and the edges of this recess are so tapered as to form bearings for shanks of varying diameter. The eye of the bolt K is also formed with an oppositely tapering bearing P and thus within certain limits any size shank may be securely clamped in position.

In use, it is merely necessary to insert the shank through the eye of the bolt K either when the latter is engaged with the aperture D of the member A or before it is so engaged. The shank may then be moved laterally into engagement with the recesses N N', and by tightening the clamping nut L the parts are securely locked in position. In order to avoid the danger of the loosening of the clamp by vibration when the vehicle is in motion, I preferably employ a locking means for the nut L, and preferably in the form of a split lock washer R. This, as illustrated in Fig. 2, is interposed between the nut L and the bearing on the portion C, and when the nut is tightly clamped this washer will prevent it from accidental loosening.

What I claim as my invention is:

1. A clip comprising a shank, a bifurcated member having open recesses formed in the furcations thereof forming seats for said shank, a bolt engaging said shank between said furcations, a clamping nut for engaging the shank of said bolt and a bearing for said nut on said bifurcated member opposed to the bearings for the shank in said furcations.

2. A clip comprising a shank, a member having a securing flange and a bifurcated portion projecting therefrom having open recesses formed in the furcations thereof for the reception of said shank, a bolt for engaging said shank between said furcations and a nut engaging said bolt having a bearing on said bifurcated member opposed to the bearing for said shank in said furcations.

3. In a clip, a member struck up from a sheet metal blank having a portion thereof fashioned to form a U-shaped section with open recesses formed in the parallel sides of the U and portions adjacent to the sides of the U-shaped portion bent into the same plane and adjacent to each other to form securing flanges.

4. In a clip, a member struck up from a sheet metal blank having a portion thereof fashioned to form a U-shaped section with open recesses formed in the sides of the U, and portions uniting with the sides of the U, but centrally severed from each other bent into the same plane perpendicular to the planes of the U-portion and with their outer ends arranged adjacent to each other.

5. A clip comprising a shank, a bifurcated member having a U-shaped portion with open recesses formed in the sides of the U constituting a seat for said shank, a bolt engaging said shank between the parallel sides of the U and passing through an aperture in the connecting portion of the U, said bolt having a threaded portion, a nut engaging the threaded portion of said bolt and a lock washer interposed between said nut and the bearing on the connecting portion of said U.

In testimony whereof I affix my signature in presence of two witnesses.

WILLIAM C. GROEHN.

Witnesses:
   Jas. A. Holihan,
   A. May.